Figure 1:
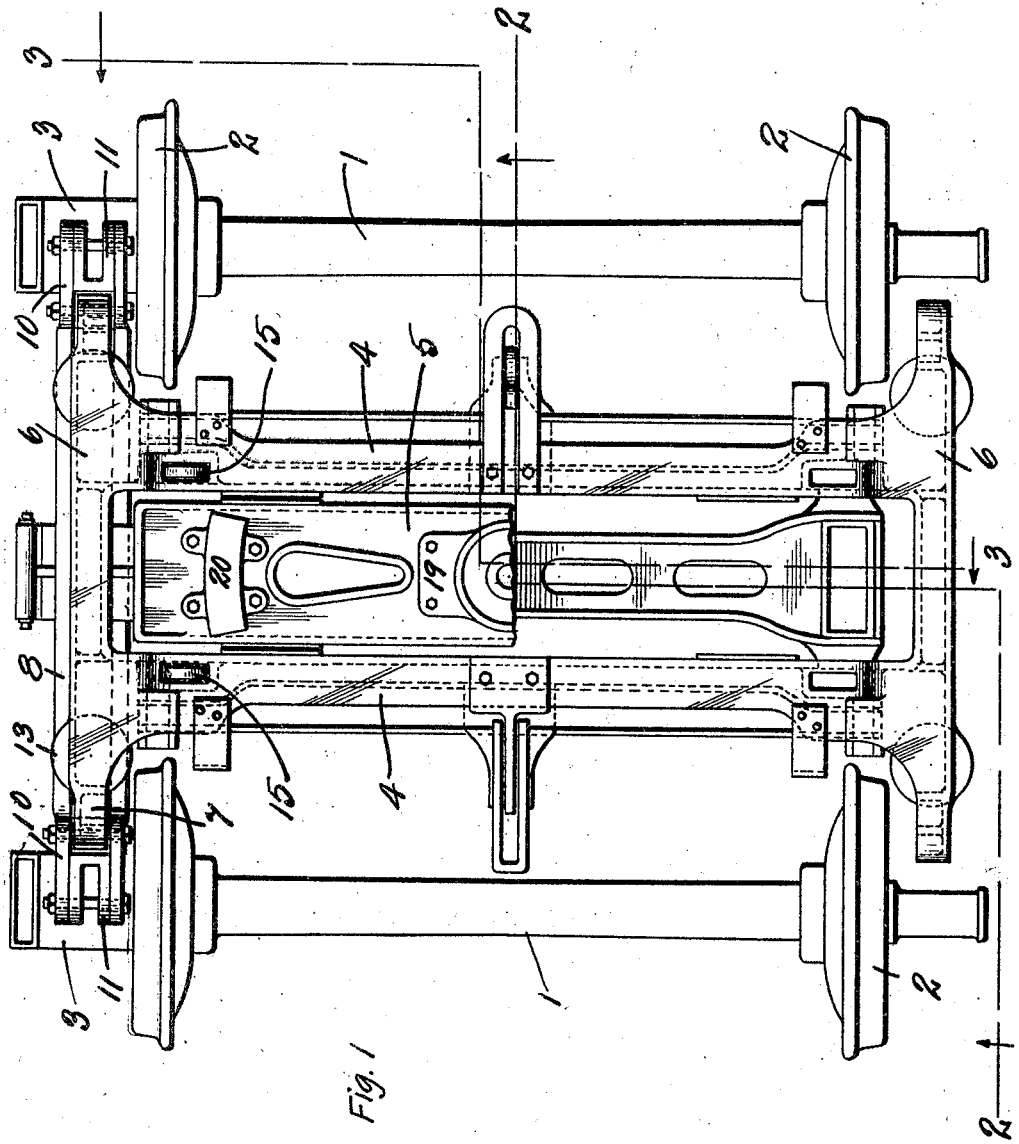

H. M. PFLAGER.
CAR TRUCK.
APPLICATION FILED AUG. 12, 1912.

1,072,645.

Patented Sept. 9, 1913.
2 SHEETS—SHEET 1.

Witnesses

Inventor
Harry M. Pflager
By F. K. Cornwall, Atty.

H. M. PFLAGER.
CAR TRUCK.
APPLICATION FILED AUG. 12, 1912.
1,072,645.
Patented Sept. 9, 1913.
2 SHEETS—SHEET 2.
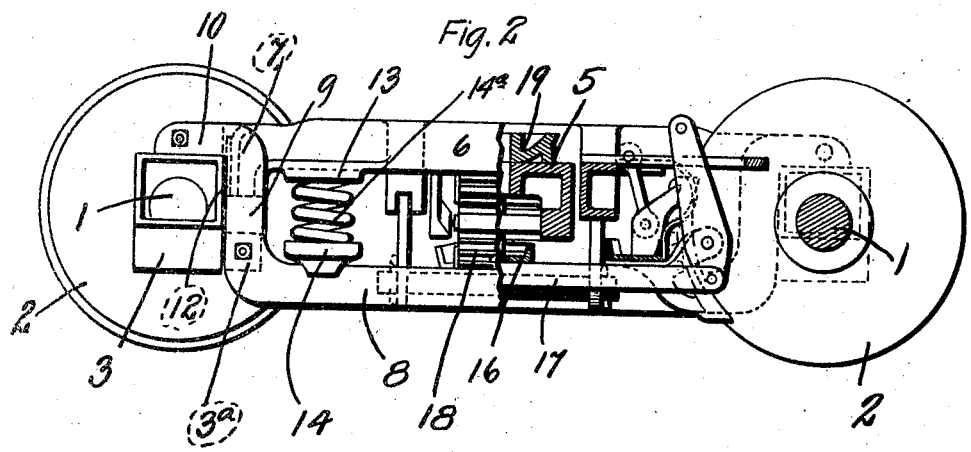
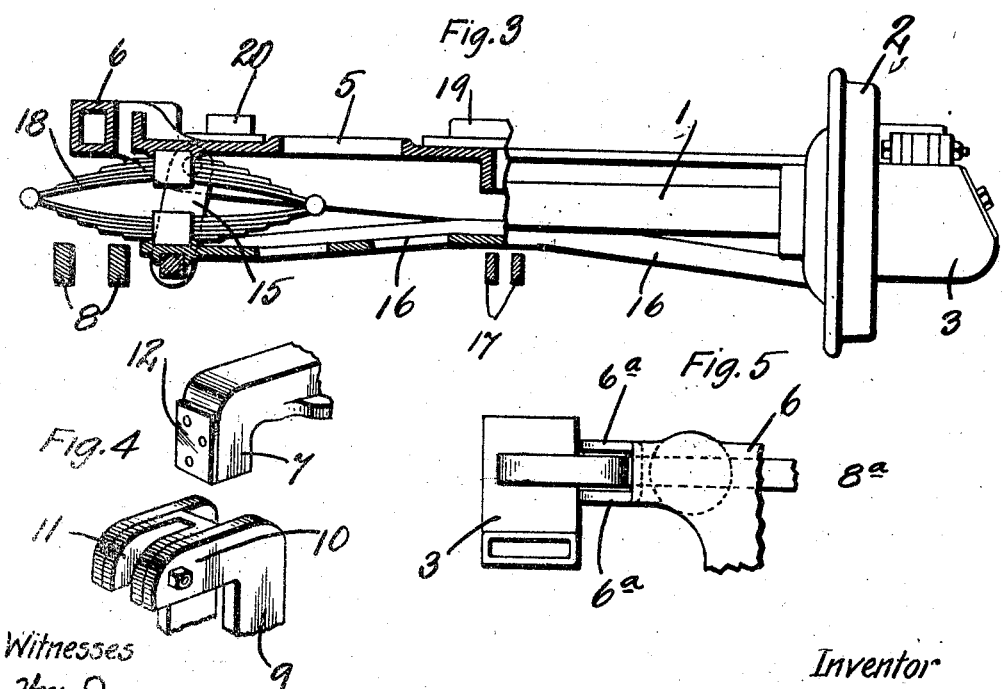
Witnesses
Inventor
Harry M. Pflager
By _____ Atty

UNITED STATES PATENT OFFICE.

HARRY M. PFLAGER, OF ST. LOUIS, MISSOURI, ASSIGNOR TO DOUBLE BODY BOLSTER COMPANY, OF ST. LOUIS, MISSOURI, A CORPORATION OF NEW JERSEY.

CAR-TRUCK.

1,072,645.  Specification of Letters Patent.  Patented Sept. 9, 1913.

Application filed August 12, 1912.  Serial No. 714,594.

*To all whom it may concern:*

Be it known that I, HARRY M. PFLAGER, a citizen of the United States, residing at St. Louis, Missouri, have invented a certain new and useful Improvement in Car-Trucks, of which the following is a full, clear, and exact description, such as will enable others skilled in the art to which it appertains to make and use the same, reference being had to the accompanying drawings, forming part of this specification, in which—

Figure 1 is a top plan view of a car truck constructed in accordance with my invention, parts thereof being broken away for the purpose of more clearly illustrating certain details of construction of said truck. Fig. 2 is a side elevation partly in section, said view being taken approximately on the line 2—2 of Fig. 1. Fig. 3 is an end elevation partly in section, said view being taken approximately on the line 3—3 of Fig. 1. Fig. 4 is a perspective view showing one end of one of the wheel pieces of the truck and the ends of the corresponding equalizer bars. Fig. 5 is a plan view of a modified construction of the end portion of the wheel base.

My invention relates generally to car trucks and more particularly to the arrangement and construction of the end portions of the wheel pieces of the truck frame and the end portions of the equalizer bars.

In certain types of car trucks, and particularly those used beneath trailer cars operating on street and suburban railways it is desirable to provide a truck having a comparatively narrow wheel base and a comparatively low center bearing plate, which latter arrangement permits the floor of the car body to occupy a comparatively low plane, consequently reducing the number of steps at the sides of the car platforms or at the entrance and exit openings.

The principal objects of my invention are, to construct a comparatively simple, strong and durable car truck particularly adapted for cars used on street and interurban railways, which truck has a comparatively short wheel base and the truck frame being arranged in a comparatively low plane and lying wholly between the journal boxes, and further to construct the truck frame comprising the wheel pieces and transoms in a single piece, thereby obtaining ample rigidity and doing away with the time, labor and expense involved in assembling the requisite number of parts utilized in a truck frame of built-up construction.

With the above and other objects in view, my invention consists in certain novel features of construction and arrangement of parts hereinafter more fully described and claimed.

Referring by numerals to the accompanying drawings, 1 designates the axles, 2 the wheels thereon and 3 the journal boxes of ordinary construction.

The frame of my improved truck is formed in a single piece, preferably by casting, and comprises a pair of flanged transoms 4, the same being spaced a sufficient distance apart to accommodate a truck bolster 5 of ordinary construction, and integral with the ends of these transoms are flanged wheel pieces 6, the end portions of which are extended downward to form depending heads or brackets 7.

Pairs of equalizer bars 8 of ordinary construction are arranged between the journal boxes 3, and portions of these equalizer bars near their ends are bent so as to form vertically disposed legs 9 which occupy positions against the inner side faces of the journal boxes 3, and the ends 10 of said equalizer bars are bent so as to occupy a horizontally disposed plane, said ends bearing directly on top of the journal boxes.

Formed on or fixed to the inner face of each journal box 3 is an inwardly projecting lug 3ª, the same occupying a position between the lower portions of the legs 9 of the equalizer bars and being fixed thereto in a suitable manner, preferably by a bolt or rivet.

Arranged between the horizontally disposed ends 10 of the equalizer bars and fixed thereto in any suitable manner is a spacing block 11, the same bearing directly on top of the corresponding journal box.

Fixed in any suitable manner to the outer faces of the depending heads or brackets 7 of the wheel pieces are chafing plates 12, which, during the vertical movement of the truck frame, bear against the adjacent faces of the spacing blocks 11 and journal boxes 3.

Formed on or fixed to the undersides of the wheel pieces 6 are spring seats 13 and interposed between these spring seats and corresponding seats 14 on the equalizer bars 8 are comparatively heavy coil springs 14ª.

Carried by the lower ends of pairs of swing hangers 15 that are pivotally connected to and depend from the truck frame is a spring plank 16, the central portion of which is elevated with respect to its ends in order to accommodate certain of the brake rods 17. Supported by the ends of the spring plank 16 are the ordinary elliptic springs 18 which support the ends of the truck bolster 5. The bolster 5 carries the usual center bearing plate 19 and the side bearing members 20.

In the modified construction illustrated in Fig. 5 the end of the wheel piece 6 is bifurcated and the legs 6ª thus formed extend downwardly on opposite sides of a single equalizer bar 8ª.

It will be noted in my improved construction of car truck that the ends of the wheel pieces terminate inside the journal boxes, and the depending heads 7 on the ends of said wheel pieces are positioned between the upper portions of the legs 9 of the equalizer bars. Thus bearings are formed on three sides of each depending head 7, and consequently the truck frame on which the heads are formed is effectually held against excessive horizontal movement with respect to the equalizer bars, but the truck frame and parts carried thereby are free to move vertically with respect to said equalizer bars and the axles and wheels.

My improved truck is comparatively simple in construction, can be readily assembled or taken apart, provides a truck having a comparative short wheel base, and by reason of its compactness, is particularly adapted for use in connection with trailer cars used on street and interurban railways.

It will be readily understood that minor changes in the size, form and construction of the various parts of my improved truck can be made and substituted for those herein shown and described without departing from the spirit of my invention, the scope of which is set forth in the appended claims.

I claim:

1. In a car truck, the combination with equalizer bars between the journal boxes, of a truck frame, the end portions of which bear against the inner side faces of the journal boxes between the adjacent portions of the equalizer bars.

2. In a car truck, the combination with pairs of equalizer bars arranged between the journal boxes, of a truck frame cast in a single piece and comprising transoms, and wheel pieces, the ends of which are located between the pairs of equalizing bars immediately adjacent to the inner side walls of the journal boxes.

3. In a car truck provided with journal boxes, equalizer bars, the end portions of which are substantially of inverted L-shape and engage said journal boxes and a truck frame, the wheel pieces of which lie wholly between the journal boxes.

4. In a car truck, the combination with equalizer bars between the journal boxes, of a truck frame, cast in a single piece and comprising transoms, and wheel pieces, which latter lie wholly between the journal boxes.

5. In a car truck, the combination with journal boxes, of equalizer bars positioned between and fixed to said journal boxes, and a truck frame, the wheel pieces of which lie wholly between the journal boxes.

6. In a car truck, pairs of equalizer bars arranged between and bearing upon the corresponding pairs of journal boxes, means whereby the equalizer bars are fixed to the journal boxes, and a truck frame having wheel pieces, the end portions of which are positioned between the pairs of equalizer bars inside the spacing blocks.

7. In a car truck, pairs of equalizer bars arranged between and fixed to the corresponding pairs of journal boxes, spacing blocks between the ends of the pairs of equalizer bars, and a truck frame having wheel pieces, the ends of which are positioned between the equalizer bars adjacent to the spacing blocks.

8. In a car truck, the combination with journal boxes, of a pair of equalizer bars positioned between and bearing upon the corresponding pairs of journal boxes, lugs projecting from the journal boxes between the equalizer bars, fastening means passing through the equalizer bars and said lugs, and a truck frame having wheel pieces lying wholly between the journal boxes.

9. In a car truck, a truck frame comprising a pair of transoms, wheel pieces rigidly fixed to the ends of the transoms, which wheel pieces lie wholly between the journal boxes of the truck and overlie the equalizer bars supported by said journal boxes.

10. In a car truck, a truck frame comprising a pair of transoms, wheel pieces rigidly fixed to the ends of said transoms, which wheel pieces are provided with depending end portions, and said wheel pieces lying wholly between the journal boxes of the truck.

11. In a car truck the combination with the usual journal boxes, of a pair of equalizer bars arranged between each corresponding pair of journal boxes and the ends of said bars resting upon said boxes, and a truck frame having wheel pieces, the end portions of which are positioned between the end portions of the members forming the pairs of equalizer bars.

12. In a car truck, the combination with journal boxes, of a pair of equalizer bars positioned between and bearing upon each corresponding pair of journal boxes, integral lugs on the journal boxes, which lugs are positioned between the equalizer bars, fastening devices seated in said equalizer bars and the lugs, and a truck frame, the wheel pieces of which terminate between the lugs on the journal boxes.

13. In a car truck, the combination with journal boxes, of a pair of equalizer bars arranged between and bearing upon each corresponding pair of journal boxes, means whereby the pairs of equalizer bars are fixed to the journal boxes, and a one-piece truck frame, the end portions of the wheel pieces of which frame occupy positions between the equalizer bars and between the journal boxes.

14. In a car truck having equalizer bars between the journal boxes, a truck frame provided with wheel pieces, the end portions of which occupy positions between the equalizer bars adjacent to the inner side faces of the journal boxes.

In testimony whereof I hereunto affix my signature in the presence of two witnesses, this 7th day of August, 1912.

HARRY M. PFLAGER.

Witnesses:
  HAL C. BELLVILLE,
  C. T. WESTLAKE.